Aug. 2, 1966   M. S. LEIFER   3,264,528
PULSE WIDTH TEMPERATURE COMPENSATED MAGNETIC CONTROL
Filed April 18, 1963

INVENTOR.
MITCHELL S. LEIFER
BY Roland Plottel
ATTORNEY

United States Patent Office 3,264,528
Patented August 2, 1966

3,264,528
PULSE WIDTH TEMPERATURE COMPENSATED
MAGNETIC CONTROL
Mitchell S. Leifer, Forest Hills, N.Y., assignor to The Bendix Corporation, Teterboro, N.J., a corporation of Delaware
Filed Apr. 18, 1963, Ser. No. 273,995
5 Claims. (Cl. 317—123)

The invention relates generally to magnetic circuits and particularly to temperature regulation of circuits for generating drive pulses for controlling magnetic cores.

Heretofore, many methods have been used to obtain proper operation of magnetic core memories over wide temperature ranges. The three most common methods are (1) the use of wide temperature range cores, (2) the variation of drive current amplitude with temperature, and (3) the use of temperature controlled stacks. The use of wide temperature range cores is limited to temperature variations in the range of 0 to 100° C. and to maximum operating frequencies of 200 kilocycles. Temperature controlled stacks consume large amounts of power and therefore are not useful in many aerospace applications; also the time required to reach operating temperatures is a limitation. Compensation by the variation of the drive current amplitude has inherent difficulties in that the transistors used in the drive circuit must be biased for the worst case of maximum collector current as the load current may have to be varied almost a decade. This variation of current is usually accomplished by power supply variations which in turn require special power supplies that are inefficient due to the nonconstant voltage at their outputs.

Thus, it is an object of the invention to provide a completely new method of temperature compensation which has none of the disadvantages of the former methods. This new method employs pulse width compensation. Advantages of the novel method are low power consumption and high frequency operation. Also, the circuit of the invention may be easily added to pre-existing systems with only minor alteration of the system.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
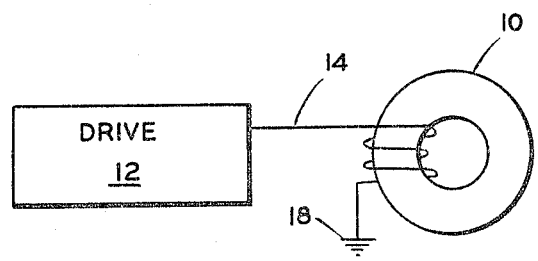
FIGURE 1 is a block diagram showing one embodiment of the invention.

In FIGURE 1 there is shown a magnetic core 10, which is of ferromagnetic material. The core properties are characterized by a flux density B, and a magnetic field strength H, where the B and H are related by the permeability $u$ of the magnetic core material, i.e.

$$B = uH$$

The permeability is nonlinear and B and H describe a well known hysteresis loop. Of concern in this invention is the fact that the permeability $u$ is a function of temperature and the hysteresis characteristics shrink and grow with temperature. This phenomenon is well known and those unfamiliar with it may refer to standard textbooks, such as Kittel, Charles, Introduction to Solid State Physics, New York, John Wiley (1953) cf. chapter 15. It is an object of the invention to magnetize core 10 a predetermined amount over a wide range.

The magnetization of the core 10 is usually controlled by application of an electrical current through a conductor surrounding the core in accordance with the well known Faraday law. In FIGURE 1, a signal for changing the flux is provided by a drive circuit 12 through a conductor 14 which encircles or loops the magnetic core 10 and is returned to ground potential 18. As the temperature of the core increases, more energy is required from the drive circuit to vary magnetization of the core and as the temperature decreases, less energy is required to vary magnetization of the core. The drive circuit 12 applies a pulse of variable energy by providing a pulse of constant amplitude but variable width. The width is automatically varied in accordance with the temperature varying characteristics of the magnetic material. The resistance of thermistor 38 changes with temperature to vary the voltage at point 42 applied to base 60 of transistor 50 to provide pulses of suitable width to magnetize core 10 to a predetermined magnetic state over a wide temperature range. The drive circuit 12 may be any convenient or conventional circuit adapted to vary pulse width as a function of temperature.

Figure 2:
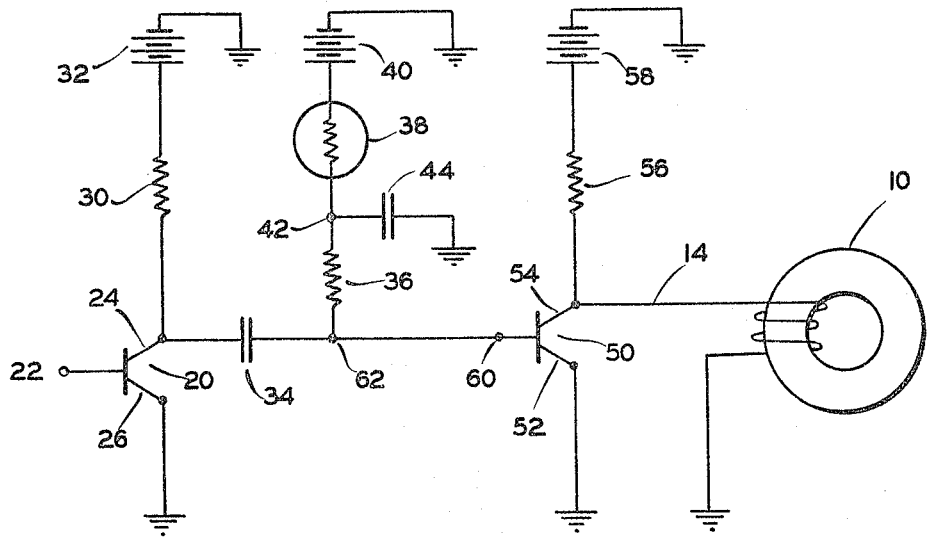
FIGURE 2 is a detailed schematic diagram of the drive circuit of FIGURE 1.

For purposes of illustration, there is shown in FIGURE 2 a suitable drive circuit. In this FIGURE 2, a first transistor 20 receives a control signal at its base 22 which renders it in a conducting or nonconducting condition so that there is provided a virtual short or open circuit between its collector 24 and its emitter 26.

The emitter 26 is connected to ground potential, and the collector 24 is connected through a current limiting resistor 30 to a source of potential 32, shown here as a battery. The collector 24 is connected through a capacitor 34, a resistor 36, and a temperature sensitive resistive element 38, shown here as a thermistor, to a second source of positive potential 40, shown here as a battery. The potential provided by source 40 is greater than the potential provided by source 32. Thermistor 38 and resistor 36 form a divider circuit and control the potentials at their junction 42. A capacitor 44 connects junction 42 to ground and provides an A.C. short circuit. The combination of the resistor 36, the thermistor 38, and the source 40 provides a potential at the junction 42 which is temperature sensitive and these elements are selected so that the potential at junction 42 varies in accordance with the temperature varying characteristics of magnetic core 10. The source 40, and the thermistor 38, might be replaced by a temperature variable source connected to terminal 42, whose output potential applied there, would vary as a function of the temperature varying characteristics of magnetic core 10.

The potential at junction 42 controls the turn off time of an output transistor 50. The transistor 50 has an emitter 52 connected to ground, and a collector 54 connected through a current limiting resistor 56 to a source of potential 58, shown here as a battery. The collector 54 is connected to an output conductor, which is the output from the drive circuit 12, and is the conductor 14 shown in FIGURE 1. The core 10 of FIGURE 1 is shown again in FIGURE 2. The output transistor 50 is controlled by a potential at its base 60, which is connected to a junction 62, of the resistor 36 and the capacitor 34. In the circuit shown, transistor 50 is normally conducting and is rendered nonconducting only for a short time interval to provide a positive pulse on conductor 14. The width of this pulse is controlled as follows: transistor 20 is normally conducting, but is momentarily rendered nonconducting by the applied signal. Thus during the nonconducting interval, there is provided at the junction 62 (of the capacitor 34 and the resistor 36) a positive spike with an exponential decay, followed by a negative spike with an exponential decay. The decay of the negative spike is a function of the time constant of capacitors 34 and 44 with resistor 36. The potential level to which the negative spike decays is determined by the potential available at the junction 42. When the potential at junction 62 goes negative during the negative spike, transistor 50 is rendered nonconducting because its base 60 is negative with respect to its emitter 52. As the negative spike exponentially decays, the potential at junction 62 (and at base 60) becomes more positive and upon reaching the trigger level of the transistor 50 (which, for example, may be 0.7 volt) the transistor 50 is turned on. As noted above, the time interval during which the transistor 50 is rendered nonconducting is determined by the temperature sensitive amplitude of potential at junction 42 to which the negative spike exponentially rises.

At the output 14 the transistor 50 is normally conducting to provide a ground potential on conductor 14. When transistor 50 goes nonconducting, there is provided a high potential at its collector 54, which is transmitted through conductor 14 to the loop around the magnetic core 10. This nonconduction of transistor 50 is controlled by the amplitude to which the negative spike exponentially decays, and this amplitude is a function of temperature, thus the output pulse width is also a function of temperature and compensates for change in permeability of core 10 with change in temperature so that magnetization of core 10 is independent of temperature. The pulse width is varied to provide constant magnetization of magnetic core 10 over a wide temperature range.

There are many different values of circuit parameters for which the circuit shown in the FIGURE 2 will function satisfactorily. Since the circuit parameters may vary according to the design for any particular application, the following circuit parameters are included for the circuit of FIGURE 2 by way of example only.

Transistors 20 and 50: 2N706A
Resistor 30 _____ ohms__ 240
Resistors:
    36 _____ kilohms__ 2.7
    56 _____ do____ 1
Capacitors:
    34 _____ picafarads__ 100
    44 _____ microfarads__ 1
Sources:
    32 _____ volts__ +6
    40 _____ do____ +18

The circuit of FIGURE 2 has the following features. The thermistor 38 may be located a considerable distance away from the balance of the circuit; also the capacitor 44 provides an A.C. short circuit, thus no alternating component is applied to the thermistor to interfere with its operation. With the examples given above, the circuit has operated satisfactorily at approximately one megacycle. The theoretical speed limitation on the circuit is the relaxation time of the magnetic core itself.

The invention has been shown with a single magnetic core. However, it will find application to multiple hold cores which includes transfluxors, and to magnetic cores arranged in a matrix for logic purposes or used for switching.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A system comprising a magnetic member having temperature variable permeability, a winding on the member, means for providing constant amplitude pulses connected to the winding for magnetizing the member in accordance with the pulses, and means for varying the width of the pulses in accordance with the temperature variable permeability of the magnetic member to provide constant magnetization of the member over a wide temperature range.

2. A system comprising a magnetic member having temperature variable permeability, and means for magnetizing the member to a predetermined magnetic state over a wide temperature range including means for providing constant amplitude pulses connected to the magnetic member for magnetizing the member, and means for varying pulse width in accordance with the temperature variable permeability of the member.

3. In combination, a temperature sensitive magnetic core requiring different quantities of electrical current to magnetize the core to a predetermined magnetic state in accordance with the temperature of the core, a winding on the core, an electrical circuit connected to the winding and providing pulses of electrical current to the winding for magnetizing the core, the circuit including means responsive to temperature and means responsive to the temperature responsive means for varying pulse width in accordance with the temperature sensitivity of the magnetic core to magnetize the core to the predetermined magnetic state over a wide temperature range.

4. In combination, a magnetic member having temperature variable permeability requiring different quantities of electricity to magnetize the member to a predetermined magnetic state in accordance with the temperature of the member, a winding on the member, an electrical circuit connected to the winding and providing constant amplitude pulses of electricity to the winding for magnetizing the core, the circuit including temperature responsive means for varying the quantity of electricity to the winding by varying pulse width in accordance with the temperature variable permeability of the member to magnetize the member to the predetermined magnetic state over a wide temperature range.

5. In a device of the kind described, a magnetic member having temperature variable permeability requiring different quantities of electrical current to magnetize the member to a predetermined magnetic state in accordance with the temperature of the member, a winding on the member for magnetizing the member, an electrical drive circuit connected to the winding and including a first transistor for providing pulses in response to a signal, a second transistor connected to the winding and connected to the first transistor and responsive to the pulses to provide a pulse output of fixed amplitude to the winding, and a thermistor responsive to temperature connected to the second transistor and providing a voltage for controlling the second transistor to vary the width of the pulse output in accordance with temperature to provide constant magnetization of the member over a wide temperature range.

References Cited by the Examiner
UNITED STATES PATENTS

| | | | |
|---|---|---|---|
| 2,914,685 | 11/1959 | McVey | 330—23 X |
| 2,919,434 | 12/1959 | Mestre | 323—70 X |
| 2,957,122 | 10/1960 | Manteuffel | 323—70 |
| 2,968,748 | 1/1961 | Davenport. | |
| 3,054,044 | 9/1962 | Shevel | 323—70 X |
| 3,117,253 | 1/1964 | Antoszewski | 317—131 |
| 3,149,293 | 9/1964 | Farkas. | |
| 3,153,748 | 10/1964 | Metzadour | 317—131 X |

STEPHEN W. CAPELLI, *Primary Examiner.*

SAMUEL BERNSTEIN, *Examiner.*

D. YUSKO, *Assistant Examiner.*